April 8, 1958 R. W. SONNENFELDT 2,830,229

ELECTRON BEAM DEFLECTION CIRCUITS

Filed July 6, 1954 2 Sheets-Sheet 1

INVENTOR.
RICHARD W. SONNENFELDT
BY
[signature]
ATTORNEY

April 8, 1958 R. W. SONNENFELDT 2,830,229

ELECTRON BEAM DEFLECTION CIRCUITS

Filed July 6, 1954 2 Sheets-Sheet 2

INVENTOR.
RICHARD W. SONNENFELDT
BY [signature]
ATTORNEY

United States Patent Office 2,830,229
Patented Apr. 8, 1958

2,830,229

ELECTRON BEAM DEFLECTION CIRCUITS

Richard Wolfgang Sonnenfeldt, Haddonfield, N. J., assignor to Radio Corporation of America, a corporation of Delaware Application July 6, 1954, Serial No. 441,536

3 Claims. (Cl. 315—27)

The invention relates to electron beam deflection circuits and it particularly pertains to electron beam deflection wave generators of improved stability and simplified construction for use in television receiving circuits.

In present television practice, the image is formed in the cathode ray tube by an electron beam which is deflected to trace successive lines of a raster upon a fluorescent screen. Deflection of this beam is accomplished magnetically by use of deflection windings arranged in a yoke fitting around the neck of the cathode ray tube. A sawtooth wave of current is injected into the deflection yoke windings to produce a magnetic field varying in sawtooth manner with respect to time. This sawtooth wave is usually obtained from a deflection circuit comprising a relaxation oscillator coupled to a power output tube and an output transformer. The relaxation oscillator is triggered by synchronizing pulses obtained from the received television signal to cause an abrupt discharge of a capacitor which is charged slowly through a resistive network. Such a relaxation oscillator is subject to spurious noise which may be picked up with the received signal and may include voltage pulses of sufficient amplitude to drop the oscillator out of synchronization.

An object of the invention is to provide an electron beam deflection circuit of simplified construction having improved stability and capable of driving a conventional magnetic deflection yoke.

Another object of the invention is to provide such a circuit capable of linear beam deflection independently of the operating potential variations and of tube aging.

A further object of the invention is to provide an electron beam deflection oscillator circuit which can be automatically frequency controlled in response to a synchronizing pulse train.

Still another object of the invention is to provide an electron beam sweep frequency oscillator having simplified frequency and phase adjusting controls thereby to simplify the servicing problem.

The objects of the invention are attained by an electron beam deflection wave generator in the form of a two stage amplifier circuit arrangement with a positive feedback path incorporating frequency determining oscillating circuit with a high figure of merit or Q coupled thereto.

More particularly, the objects of the invention are achieved in an electron beam deflection wave generator having driver and output power amplifier tubes connected in cascade, a sine wave generating circuit tuned to the deflecting wave frequency and coupled to a positive feedback path between the power amplifier and the driver tubes to impart stability to the generation of the output wave from the power amplifier tube. The sine wave generating circuit is tuned to parallel resonance at the deflection wave frequency and shock excited by the pulse output of the power amplifier to produce a sine wave. The output pulses and the sine wave produced in response to these pulses are mixed, in proportions determined by a current controlling network, and applied to the driver tube. The bias on the driver tube is adjusted to clip the resultant wave to provide a substantially square wave signal at the output of the driver tube. The output power amplifier tube is driven rapidly between anode current cutoff and anode current saturation. The deflection wave generator or sweep oscillator thus constituted is extremely well stabilized in frequency due to the presence of the relatively high figure of merit or Q of the parallel resonant circuit. The linearity of the sweep developed by the generator according to the invention is very largely determined by the duty cycle of the power amplifier and is substantially independent of the variations in operating potential and variations in tube characteristics due to aging.

Automatic frequency control of the deflection wave generator is obtained according to the invention by applying pulses obtained at the output of the power amplifier tube and deflection synchronizing signal pulses of polarity opposite to that of the deflection pulse to a phase detecting comparator circuit coupled to an automatic control (AFC) tube. The relative overlap of these positive and negative pulse signals determines the degree of conduction of the AFC control tube, the output of which is coupled by means of a filter network to the input of the driver tube of the electron beam deflection wave generator to augment the bias thereat in accordance with the basic principles of the invention to synchronize the frequency of the electron beam deflection wave generator with the synchronizing pulses.

In order that the invention may be more clearly understood and readily put to practice an embodiment thereof will be described, by way of example only, with reference to the accompanying drawing forming a part of the specification and in which.

Figures 1, 2:
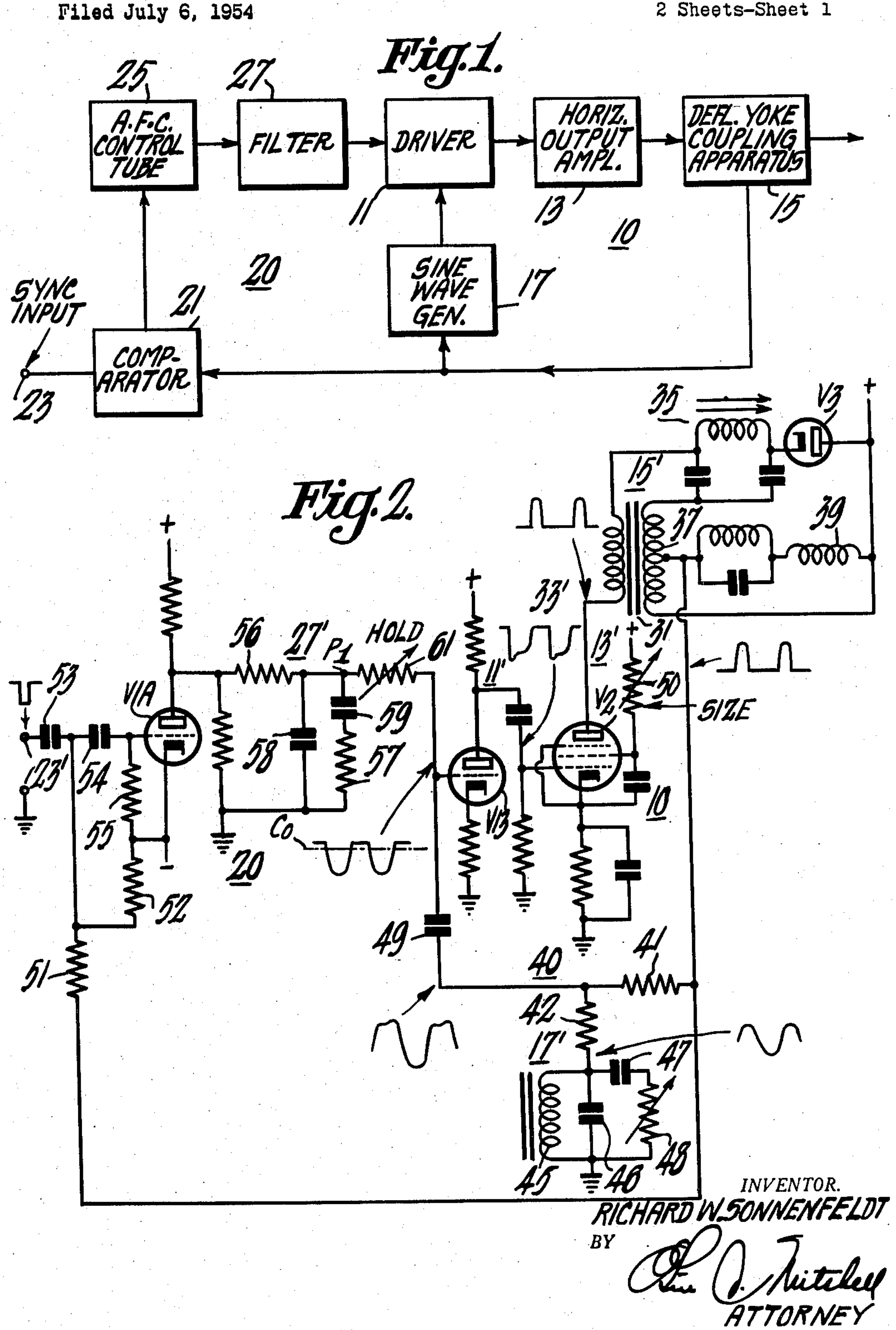
Fig. 1 is a functional diagram of an electron beam deflection wave generator according to the invention.
Fig. 2 is a schematic diagram of an embodiment of the invention as illustrated in Fig. 1.

In Fig. 1 there is shown a functional diagram of an electron beam deflection wave generator 10 according to the invention comprising a driver circuit 11 which is coupled to a power amplifier circuit 13 to the output of which deflection yoke coupling apparatus 15 is connected. The deflection yoke of a cathode ray tube deflection system is connected to the coupling apparatus 15 for excitation in the usual manner but in and of itself does not form any part of the circuit arrangement according to the invention. Energy from the output of the deflection yoke coupling apparatus 15 which is proportional to that applied to the deflection yoke windings is applied to a sine wave generating circuit 17 which is tuned to the frequency of the electron beam deflecting wave. The sine wave produced by this stage 17 combined with the portion of the output energy wave applied to this stage is applied to the driver circuit 11 which serves as an amplifier and phase inverter providing the necessary amplitude and phase relationship for regeneration of the deflection wave at the desired frequency of operation. The driver circuit 11 is arranged to produce a substantially square wave driving the power amplifier circuit rapidly from the blocked to the full current condition. The linearity of the deflection wave produced is largely determined by the duty cycle of the power amplifier circuit as briefly set forth hereinbefore.

The electron beam deflection generator 10 according to the invention may be synchronized with a synchronizing pulse signal by conventional synchronizing circuitry; however, according to the invention the generator 10 is preferably synchronized by means of a coincidence type phase detector 20. This phase detector comprises a comparator circuit 21 to which a synchronizing pulse train is applied at input terminals 23 together with the output pulse train from the deflection yoke coupling apparatus 15. These two pulse trains are applied at substantially the same amplitude and in opposite polarity so that the conduction of an automatic frequency (AFC) control tube 25 is substantially proportional to the degree of overlap of the pulse from these two pulse trains. A filter network 27 is coupled to the AFC control tube 25 to produce a direct current output which is applied to the driver circuit 11 to augment the bias thereon. The change in bias brought about by the AFC circuit 20 tends to vary the duty cycle of the square wave applied by the driver circuit 11 to the horizontal output amplifier circuit 13 which in turn affects the frequency of the oscillation of the electron beam deflection wave generator 10 as previously described, synchronizing the generator 10 with the information obtained at the synchronizing signal input terminals 23.

A schematic diagram of an embodiment of the invention performing the functions indicated by the arrangement outlined in Fig. 1 for use in the horizontal deflection circuitry of a television receiver is shown in Fig. 2. The driver circuit 11′ comprises an electron discharge system in the form of a vacuum tube V1B, which in practive is preferably one section of a dual triode tube in the interests of space-saving and cost-reduction. Driving voltage, essentially in square wave form, is obtained from the anode of the driver tube V1B and applied to the power amplifier circuit 13′ at the control grid of an electron discharge device, preferably in the form of a pentode, vacuum tube V2. The power amplifier tube V2 is driven between anode current cutoff and anode current saturation to produce a train of positive-going current pulses. This train of pulses is applied to the horizontal deflection yoke windings through the intermediary of deflection yoke coupling apparatus 15′ shown here as a transformer 31. This portion of the circuit is a substantially conventional horizontal deflection television sweep circuit arrangement with the anode of the power amplifier tube V2 connected by way of the primary winding 33 of the horizontal output and high voltage developing flyback transformeer 31, a width coil 35 and a damper tube V3 to a point of positive direct operating potential. The pulse train flowing through the primary winding 33 is induced in the secondary winding 37 across a portion of which the windings 39, of the deflection yoke are connected. The impedance of the output transformer 31 as loaded by the deflection windings 39 is matched to the output circuit impedance of the power amplifier tube V2. The inductance thereby presented the amplifier tube V2 controls the anode-cathode current flow to the extent that this current flow is substantially independent of the amplitude of the voltage applied between the control grid and the cathode of the amplifier tube V2. The form of the output pulses from the amplifier tube V2 is such that a sawtooth magnetic wave is developed across the neck of the kinescope about which the yoke is arranged. Output pulses from the amplifier tube V2 are obtained preferably at the secondary winding 37 of the deflection yoke coupling transformer 31 and applied through a current controlling network 40 comprising a pair of resistance elements 41 and 42 connected in series to the sine wave generating circuit 17′ shown here in the form of a tuned circuit having an inductor 45 and a capacitor 46. The inductor 45 and the capacitor 46 have reactance values at which the circuit is tuned to parallel resonance at the desired deflecting wave frequency, which is 15.75 kc. (kilocycles per second) in the example given. Phase adjustment is provided by means of a series circuit comprising a capacitor 47 and a variable resistor 48, connected across the parallel resonant circuit. The positive going output pulses shock excite the sine wave generating circuit 17′ to produce a potential of continuous sine wave form across the inductor-capacitor combination 45—46. This sine wave voltage together with the pulse train originating at the anode of the output amplifier tube V2 are combined to form a resultant which is perhaps best characterized as merely a distorted sine wave; the degree of distortion depending upon the relative amplitudes and phase relationships of the two waves. The resulting distorted sine wave is applied by means of a coupling capacitor 49 to the grid of the driver tube V1B. The driver tube V1B is biased so that the tube V1B conducts only on the portions of the distorted sine wave of given nature—positive portions in the example—applied by way of the coupling capacitor 49. The bias is preferably further set so that only the upper part of the distorted wave is effective in rendering the driver tube V1B conducting. The output signal wave at the anode of the driver tube V1B is substantially a square wave of width depending primarily upon the phase relationship between the pulse output of the amplifier tube V2 and the sine wave generated in the sine wave generating circuit 17′. The amplitude of the output of the driver tube V1B is arranged to be of sufficient magnitude to drive the output amplifier tube V2B from below anode current cutoff to anode current saturation whereby the output pulses in a positive going pulse train have fairly straight risers. The inductive loading of the output amplifier tube V2 by the deflection windings 39 insures a nearly linear rate of time rise of yoke current for a wide latitude of wave shape at the grid of the amplifier tube V2. Therefore, the linearity of the sweep thus developed is very largely determined by the duty cycle of the amplifier tube V2. This result is enhanced by the capability of the damping tube V3 to reinsert energy in conjunction with the usual reactive linearity correction element 35, commonly provided in the horizontal deflection circuit of television receivers and the like. The square wave applied to the grid of the amplifier tube V2 therefore properly deflects the beam of a television kinescope and at the same time offers decided advantages over the conventional sawtooth wave applied to the more conventional output tube circuit. Normal variations in operating potential due to fluctuations of the A. C. power line voltage will not affect the linearity of deflection, if the square wave applied to the control grid of the power amplifier tube V2 is arranged to hold this tube securely below cutoff during the negative half cycle for the lowest line voltage expected to be encountered. The input circuit of the power amplifier tube V2 is free from the frequency determining characteristics of the time constant at the grid of the power amplifier tube of the conventional sawtooth sweep oscillator. The only important requirement with respect to RC combinations is that the input circuit of the driver tube V1B be arranged for proper clipping to insure that the desired degree of asymmetry and required rise time in the grid wave form is obtained. By proper choice of the resistance and capacitance components a time constant is obtained that will have little effect on the frequency when the value of the components drift; or when the tube ages. The major frequency controlling element is the resonant circuit 17′ comprising the inductor 45 and the capacitor 46. The stability of the deflection wave generator 10 is varied by adjusting the ratio of value of the resistor 41 to that of the resistor 42. For a given value of the resistor 41, the stability of the circuit is completely controllable in practice by varying the value of the resistor 42; the stability increasing as the resistance value is lowered. The value chosen depends primarily upon the desired AFC sensitivity. The further or screen grid of the pentode amplifier tube V2 is arranged to have the potential thereon varied by a variable resistor 50 in the usual manner to form the horizontal size control. This size control also affects the duty cycle of the output tube V2 because a variation in the screen voltage varies the voltage at which the anode current of the particular tube under consideration is cut off. The service man need only adjust the size control in aligning a television receiver incorporating the deflection circuit of the invention whereby the proper adjustment of duty cycle will be made automatically.

Figure 3:
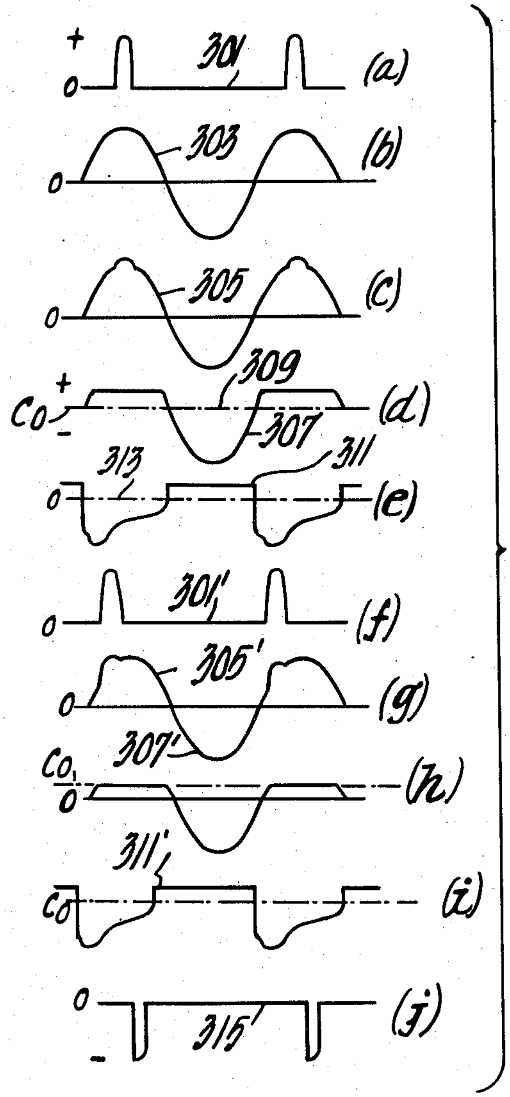
Fig. 3 is a graphical representation of wave forms obtained with the circuit shown in the schematic diagram of Fig. 2.

Fig. 3 is a graphical representation of a series of wave form obtained with the circuit arrangement shown in Fig. 2. Two pulses of a train of output pulses obtained at the anode of the amplifier tube V2 are shown by the curve 301. These pulses are represented as being in the proper time phase relationship for ideal operation of the circuit arrangement according to the invention. These pulses shown in the curve 301 are applied to the resonant circuit 17' to produce the sine wave shown by the curve 303 as being-in-phase with the pulses of the curve 301. Combining the two waves for application to the grid of the driving tube V1B results in the wave form represented by the curve 305. This wave form is shown as being only slightly distorted at the crest of the positive half cycles. This distortion does not affect the duty cycle of the driving wave to any extent since it is well beyond the amplitude value corresponding to anode current cutoff of the output amplifier tube V2B. The curve 307 represents the wave 305 after clipping in the grid circuit of the driver tube V1B; the line 309 representing the cutoff voltage of the tube V1B so that the effective wave form applied to the driver tube V1B is substantially a square wave. The curve 311 represents the output of the driver tube V1B as applied to the grid of the amplifier tube V2 with the cutoff voltage value of this tube represented by the line 313. The curve 301' represents an output pulse train with the pulses displaced a small amount both in phase and frequency from the desired values. When the wave form represented by the curve 301' is added to the sine wave form 303 the distorted sine wave form 305' results. The distortion is very much greater in this case than in the previous example whereby the square wave applied to the grid of the driver tube V1B as shown by the curve 307' has a different duty cycle. These heavier duty cycles at the input of the driver tube V1B effects a heavier duty cycle for the square wave 311' at the grid of the output amplifier tube V2. In this manner the duty cycle is adjusted to provide output pulses of greater width which on being combined with the sine wave out of the sine wave generating circuit 17' tend to correct the frequency drift and the phase shift. It should be noted that if the frequency deviation and phase shift were in the opposite direction the very same effect would be had; that is, the square wave duty cycle would become heavier due to shifting of the trailing edge, rather than the leading edge as in the previous example. The effect of changing the duty cycle is the same insofar as the phase relationship alone is concerned but due to the spacing between the output pulses being of opposite sense, that is, the pulses being closer to each other rather than farther apart as in the example above, the circuit will tend to fall back into synchronism with the sine wave generated by the resonant circuit 17'.

It is, of course, necessary that the electron beam deflection generator 10 be synchronized with the signal being transmitted by the broadcast station. The conventional horizontal synchronizing pulses obtained in known manner from the received signal are inverted to form negative pulses which are combined in the comparator circuit 21' with the positive going pulses obtained from the deflection system coupling transformer 31 to result in a signal whose peak amplitude provides a measure of the relative timing of these two wave forms. This signal is applied to the input circuit of an electron discharge structure in the form of a vacuum tube V1A. The resistor 51, the resistor 52, and the capacitor 53 constitute a shaping and a dividing network from which the timing wave form is applied across the coupling capacitor 54 to the control grid of the AFC control tube V1A which runs at self-bias across the resistor 55, the bias being a measure of timing. The current flow through the automatic frequency control tube V1A is determined by the relative overlap of the two pulse waves. The direct voltage at the grid of the AFC control tube V1A appears amplified at the anode where the filter network comprising the resistors 56 and 57 and the capacitors 58 and 59 removes the remaining high frequency components to furnish an integrated direct control voltage at the point P1 for application to the grid of the driver tube V1B through the intermediary of a variable resistor 61 which serves as the horizontal hold control in the example given. In operating a television receiver incorporating the invention this control is set so that the driver tube V1B is biased to operate at the in-phase condition, that is the condition where the output pulses are in phase with synchronizing pulses. The relationship of the synchronizing pulses to the other wave forms is shown in the curve 315 of Fig. 3. Initially the frequency of the electron beam deflection generator 10 is set by adjusting the variable inductor 45 with the horizontal hold control 61 in the central position and a 10 microfarad capacitor temporarily connected between the point P1 and ground to disable the AFC system. Upon removal of the capacitor, the sweep will lock automatically in the correct phase. The principles of operation of the system according to the irnvention may be readily extended if higher power is required. Two or more output power amplifier tubes may be operated in parallel with the necessary appropriate changes in the output circuit. Possibly an adjustment of the feedback amplitude across the current controlling resistor 41 may then be necessary. Should yoke pulses of negative polarity be desired, a properly damped and polarized feedback winding may be provided on the output transformer 31 to furnish regenerative feedback and AFC phase information, or positive going horizontal synchronizing pulses may be compared with the negative output pulses. The proper amount of feedback is controllable in every case by proper choice of the resistance values of the current controlling resistors 41 and 42. If it should be necessary to change these resistors, it is necessary to verify that synchronizing pulse injection to the oscillator is negligible. This is done by grounding the point P1 and tuning the oscillator to the correct frequency and determining the absence of any tendency to lock.

In one arrangement tried out in practice the circuit arrangement according to the invention was used as a horizontal deflection wave generator in a television receiver. The oscillator circuit was tuned to a frequency of 15.75 kc. With this circuit a phase sensitivity on the order of one microsecond was obtained, the noise performance was equal to that of the conventional synchroguide AFC system, and a substantial power saving and savings in component parts was effected.

In the tested arrangement the following component parts values were used.

| Reference No. | Component | Value |
|---|---|---|
| V1A-B | AFC and Driver Tubes | 6SN7. |
| V2 | Amplifier Tube | 6CD6. |
| V3 | Damper Tube | 5V4G. |
| 41 | Resistor | 2.7 megohms. |
| 42 | do | 4.7 kilohms. |
| 45 | Variable Inductor | 8-12 milhenries. |
| 46 | Capacitor | 1200 mmfd. |
| 47 | do | 120 mmf. |
| 48 | Variable Resistor | 100 kilohms. |
| 49 | Capacitor | 220 mfd. |
| 50 | Size Control Resistor | 8-18 kilohms. |
| 51 | Resistor | 8.2 megohms. |
| 52 | do | 10 kilohms. |
| 53 | Capacitor | 100 mmfd. |
| 54 | do | 820 mmfd. |
| 55 | Resistor | 470 kilohms. |
| 56 | do | 100 kilohms. |
| 57 | do | 330 ohms. |
| 58 | Capacitor | 0.03 mfd. |
| 59 | do | 0.5 mfd. |
| 61 | Hold Control Resistor | 390-440 kilohms. |

The power supply used delivered 250 volts positive at the points marked (+) in the drawing and 120 volts negative at the points marked (−) in the drawing both with respect to ground. It is understood that other values will be suggested to those skilled in the art for other applications of the invention.

The invention claimed is:

1. In a deflection wave generating system for delivering deflection power to a cathode ray deflection yoke requiring an operating current waveform which is substantially sawtooth in character and of a predetermined recurrence frequency, said operating current waveform defining a sweep interval and a flyback interval, the combination of: an output amplifier device having a limited linear signal transfer range, an input circuit and an output circuit, said output circuit being arranged for connection to a cathode ray deflection yoke, said output circuit including parameters which present a predominantly inductive load to said amplifier device when said amplifier device is delivering sawtooth type output current to a deflection yoke; means coupled with said output circuit for extracting therefrom a pulsed waveform corresponding to the flyback interval of the operating current waveform required by said deflection yoke; a tuned circuit resonant to a frequency substantially equal to the nominal recurrence frequency of the required operating current; means including an impedance mixing network for applying said extracted pulse waveform to said tuned circuit to excite resonant sine wave ringing therein and the production of a resultant sine wave voltage thereacross to develop a composite signal representing the addition of said sine wave voltage and said pulsed waveform such that said composite signal includes the proper proportions of both said sine wave voltage pulsed waveform to provide a waveform characteristic for said composite signal which has a flattened extremity in one polarity direction and a rounded extremity in the other polarity direction; apparatus for inverting the phase of an electrical signal and clipping one polarity excursion thereof, said apparatus having input terminals and output terminals; means operatively coupling said composite signal to said inverting and clipping apparatus for clipping the rounded extremity of said composite signal to produce at said output terminal a driving signal having a substantially clipped square wave excursion in one polarity direction with said substantially flattened extremity extending in the other polarity direction; and means operatively coupling the output terminals of said inverting and clipping apparatus to the input circuit of said output amplifier device with such amplitude and electrical sense as to regeneratively drive said amplifier device beyond its linear operating signal transfer range to produce a self-sustained oscillation in said amplifier device.

2. In a deflection wave generating system for driving a cathode ray beam deflection yoke with a deflection signal of predetermined periodicity, the combination of: an amplifier device having a limited linear signal transfer range and having input circuit means and output circuit means, said output circuit means being arranged for the operative driving of a cathode ray beam deflection yoke; means included in said output circuit means for developing a pulsed flyback waveform upon the driving of said deflection yoke with periodically recurrent deflection signals; a tuned circuit resonant at a frequency corresponding to the predetermined periodicity of the deflection signal; impedance means operatively coupling said tuned circuit to said output circuit means for exciting said tuned circuit with said flyback waveform to produce a ringing signal which is additively combined with said flyback waveform to produce a composite waveform having a flattened extremity in one polarity excursion thereof and a rounded extremity in the other polarity excursion thereof; means regeneratively coupling said composite waveform to the input circuit of said amplifier to produce oscillation in said amplifier circuit at the resonant frequency of said tuned circuit; signal clipping means operatively included in said regenerative coupling means for clipping the rounded portion of said composite waveform to convert said rounded portion into a substantially square waveform; and means included in the input and output circuits of said amplifier device for causing said amplifier device to be driven well beyond said linear signal transfer range with an effective driving signal corresponding to said clipped composite waveform.

3. In a deflection wave generating system for driving a cathode ray deflection yoke with a sawtooth signal of a predetermined frequency and having a sweep portion and a flyback portion, the combination of: an amplifier device having an input circuit for accepting a driving signal and an output circuit, said output circuit including means for operatively coupling signals delivered by said amplifying device to a cathode ray beam deflection yoke; means coupled with said output circuit for deriving a pulsed waveform corresponding to the flyback portion of said sawtooth signal; a resonant circuit tuned to the predetermined frequency of said sawtooth signal; impedance means coupling said pulsed waveform deriving means to said resonant circuit for developing a composite waveform representing the addition of a sine wave produced by electrical ringing of said resonant circuit and a pulse train corresponding to said pulsed waveform, the addition of said sine wave pulse train rendering said composite waveform substantially flattened in one polarity excursion and substantially rounded in its other polarity excursion; means coupling said impedance means to the input circuit of said amplifier device for driving said amplifier device with said composite waveform and with such electrical sense and amplitude as to produce regenerative oscillation in said amplifier device with said composite waveform acting as a driving signal for said amplifier with an amplitude driving said amplifier well beyond its linear amplification range; and signal limiting means included in said last named means for flattening the substantially rounded extremity of said composite waveform during the driving of said amplifier device by said composite waveform.

References Cited in the file of this patent

UNITED STATES PATENTS

| | | |
|---|---|---|
| 2,277,000 | Bingley | Mar. 17, 1942 |
| 2,479,081 | Poch | Aug. 16, 1949 |
| 2,562,985 | Kronenberg | Aug. 7, 1951 |
| 2,633,555 | Tourshou | Mar. 31, 1953 |
| 2,685,033 | Volz | July 27, 1954 |